UNITED STATES PATENT OFFICE.

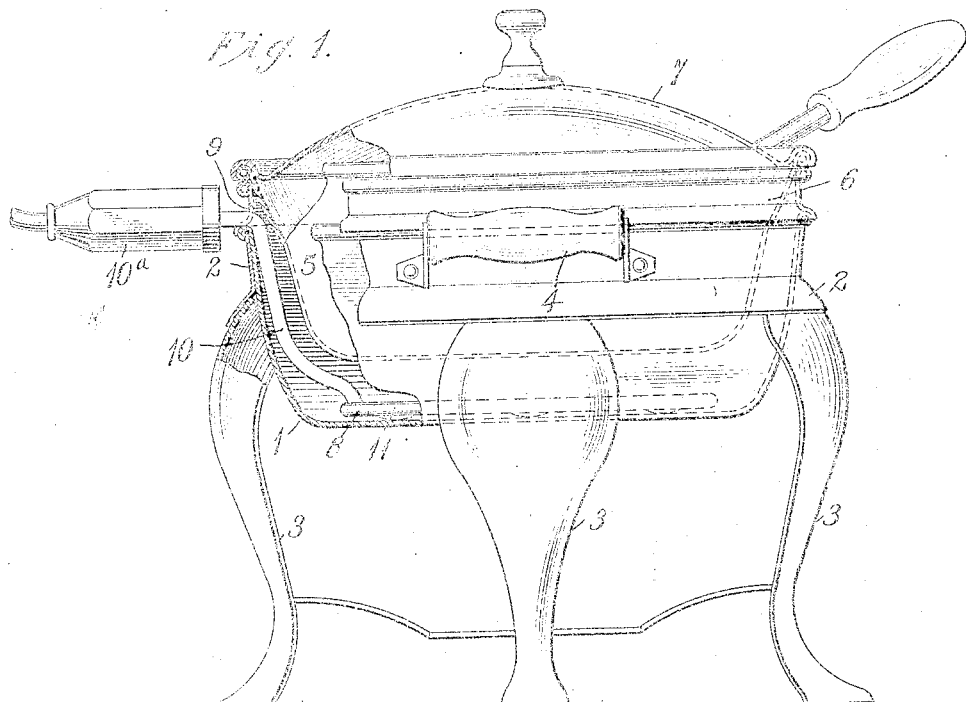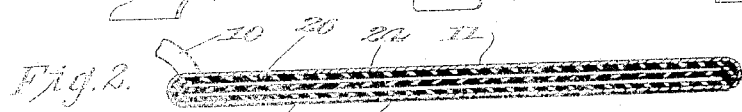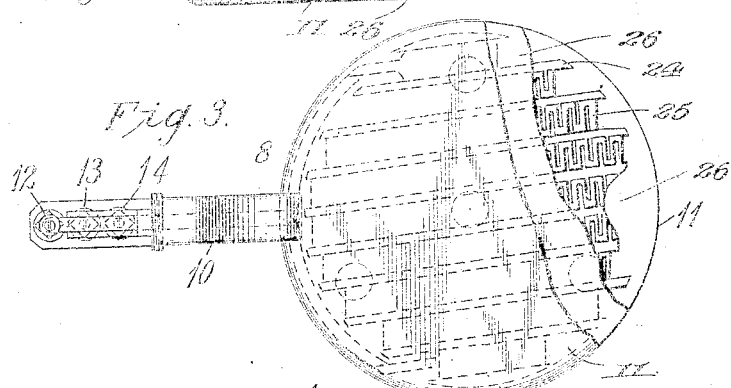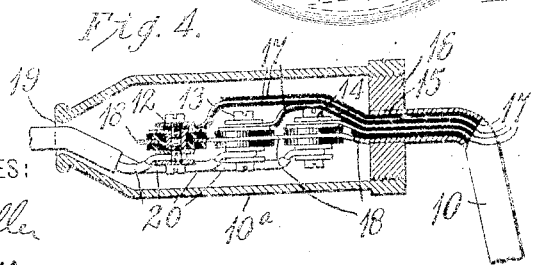

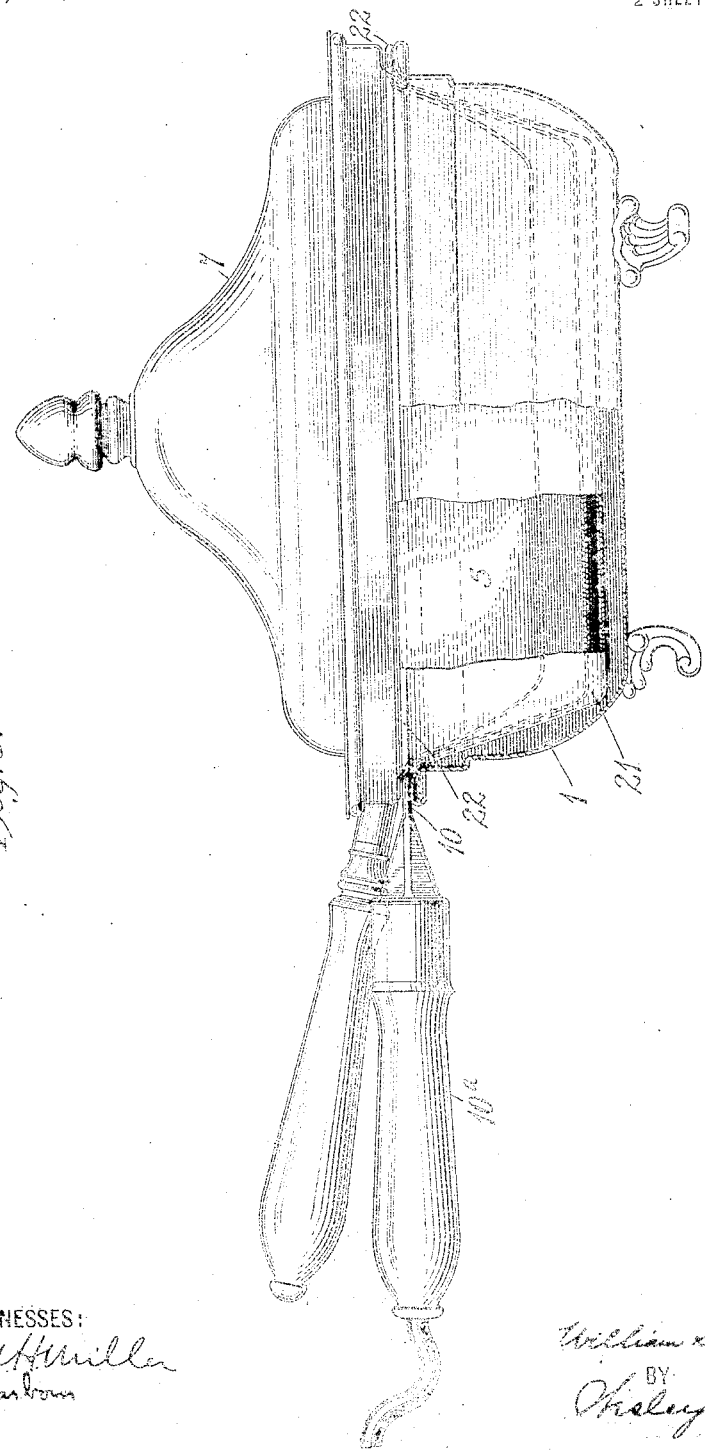

WILLIAM S. HADAWAY, JR., OF EAST ORANGE, NEW JERSEY, ASSIGNOR TO WESTINGHOUSE ELECTRIC AND MANUFACTURING COMPANY, A CORPORATION OF PENNSYLVANIA.

ELECTRICALLY-HEATED CULINARY APPARATUS.

1,210,062.   Specification of Letters Patent.   Patented Dec. 26, 1916.

Application filed June 25, 1910.   Serial No. 568,871.

*To all whom it may concern:*

Be it known that I, WILLIAM S. HADAWAY, Jr., a citizen of the United States, and a resident of East Orange, in the county of Essex and State of New Jersey, have invented a new and useful Improvement in Electrically-Heated Culinary Apparatus, of which the following is a specification.

My invention relates to electric resistance and heating devices and particularly to such as are adapted for use with electrically heated vessels and other culinary apparatus.

The object of my invention is to provide a specially simple electric heater of the class above indicated that shall be capable of continuous operation, either immersed in liquid or exposed to the air, without appreciable deterioration.

Electric heaters and electrically heated chafing dishes and other vessels have been extensively used, but such apparatus has usually been specially constructed to embody the electric heater. According to one form of my present invention, I provide a specially constructed electric heater which may be put to general use or be utilized with any of the usual forms of chafing dishes and similar devices without necessitating any structural change therein. When used for heating liquid in a vessel, the fact that the heater element is entirely within, and not built into the walls of the vessel is of special advantage, since practically all of the generated heat is available for useful work.

Figure 1 of the accompanying drawings is a partially sectional elevation of a chafing dish, or similar device provided with the heating device of my invention. Fig. 2 is a sectional view on a larger scale, and Fig. 3 is a plan view of the heating device of Fig. 1. Fig. 4 is a sectional view, on a larger scale, of the handle of the electric heating device which discloses a particularly advantageous terminal arrangement. Fig. 5 is a view, corresponding to Fig. 1, of a modified heater structure which embodies my invention.

Referring to the drawings, the device here shown comprises a hot water receptacle 1, which is supported by, and may form a part of, a stand comprising a ring 2, feet 3 and handles 4; an inner food receptacle 5, a spacing ring 6, a lid 7 and an electric heating device 8.

The device may be utilized in the usual manner without the electric heater, in which case, the ring 6 may be removed. The ring 6 is provided with a notch 9, as shown in Figs. 1 and 2, through which the handle bar 10 of the heater 8 projects.

The heating device 8 comprises a body member embodying a resistance element, and a handle member 10. The body member is constructed by welding two metal disks 11 together at their edges to inclose the flat resistance element which comprises one or more insulating disks 24 on which flattened helices of resistance ribbon 25 are wound as shown in Fig. 3, the insulating disks being notched to hold the ribbons in position. Additional insulating disks 26 separate the helices from the metal disks and, when the body of the heating device is assembled, the parts are all in intimate contact.

The handle member comprises a flattened metal tube which is welded to the body member and through which the leads are threaded, and a hollow handle 10ª which is mounted on the outer end of the tube to inclose the terminal members 12, 13 and 14.

The handle bar 10 constitutes a sheath for the resistance leads which extend into the hollow handle 10ª through a hole 15 in a screw-threaded enlargement 16 near the outer end of the handle bar and are severally secured to the terminal members 12, 13 and 14, being separated from each other by strips 17 of mica or other suitable insulating material. The terminal members are secured to and are insulated from a projection 18 which extends from the handle bar into the hollow handle.

The hollow handle 10ª is tapped at one end to engage the screw threaded enlargement 16 and is provided with a constricted opening 19 at the opposite end to receive circuit conductors 20.

By arranging the terminal members 12, 13 and 14 in the same straight line, the size of the handle may be materially reduced, while, at the same time, it is possible to secure a certain amount of heat control, since an intermediate tap is brought out from the resistance.

In Fig. 5, the heater is shown as arranged in the form of a dish or pan 21, the sides of which are flaring and terminate in a flange 22 which extends between the outer and inner vessels of the device and renders the spacing ring 6 unnecessary. The dish or pan may be utilized as an electrically heated frying pan, stove or similar device, apart from the vessels 1 and 5.

While I have illustrated my invention in connection with a single form of culinary apparatus, it is, of course, not restricted to any particular kind of apparatus, and I desire that only such limitations shall be imposed as are indicated in the appended claims.

I claim as my invention:

1. An electric heating device comprising a body member, a set of supply conductors, a set of terminal conductors, an inclosing tube for the terminal conductors that terminates in a metal strip, a set of insulated binding posts secured to said strip in a longitudinal row and serving to connect the ends of the supply conductors at one side of said strip with the ends of the terminal conductors at the other side thereof, and a hollow handle removably secured to the outer end of the tube and inclosing the binding posts.

2. An electric heating device comprising a body member, a set of supply conductors, a metallic strip interposed between the said conductors, a set of binding posts secured to the said strip and insulated therefrom by means of insulating washers, the said binding posts serving to connect the ends of the supply conductors at one side of the said strip with the ends of the terminal conductors at the other side thereof, and a hollow handle surrounding the said binding posts and the said strip.

In testimony whereof, I have hereunto subscribed my name this 20" day of June, 1910.

WILLIAM S. HADAWAY, Jr.

Witnesses:
W. O. PEALE,
B. B. ̲ɪɴᴇs.